No. 806,800. PATENTED DEC. 12, 1905.
F. E. GREATHOUSE.
REEL CARRIER.
APPLICATION FILED JUNE 30, 1905.
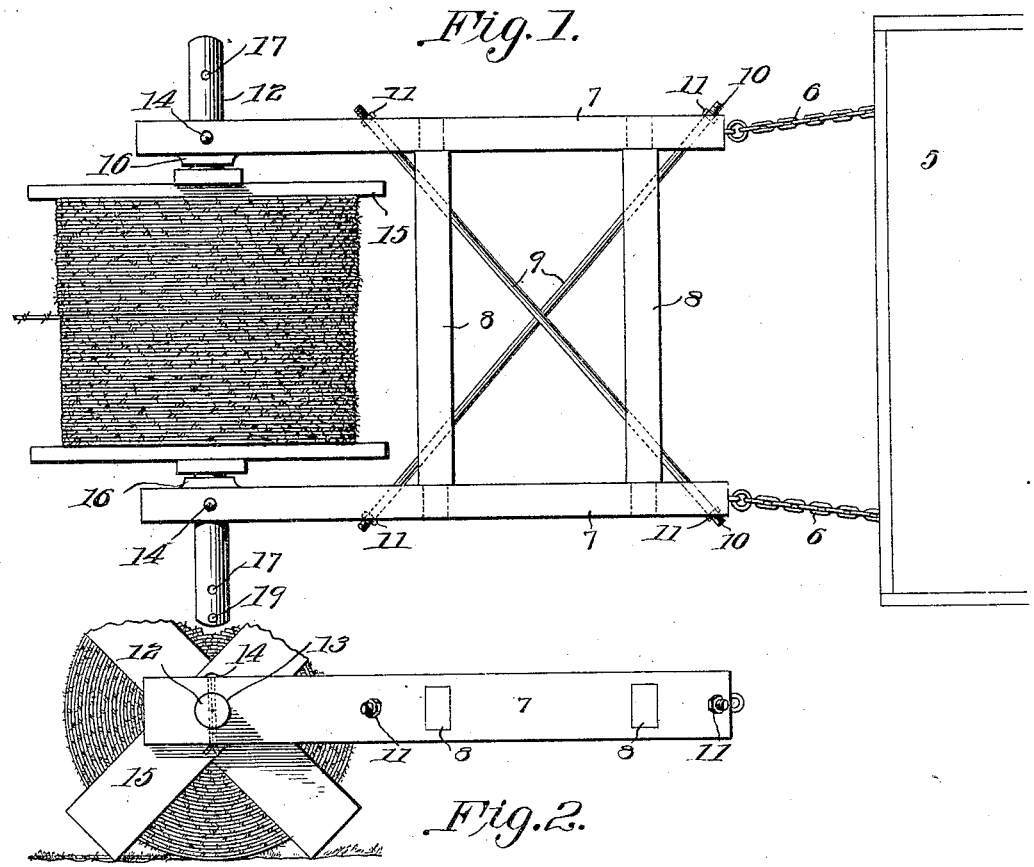
Fig. 1.
Fig. 2.
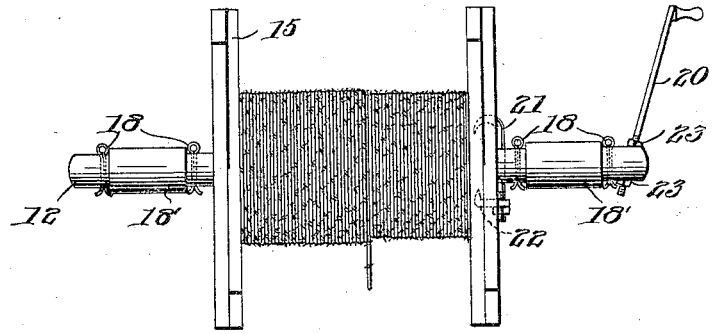
Fig. 3.
Fleming E. Greathouse,
Inventor.
Witnesses
by C. A. Snow & Co.
Attorneys

UNITED STATES PATENT OFFICE.

FLEMING E. GREATHOUSE, OF GARDEN CITY, KANSAS.

REEL-CARRIER.

No. 806,800. Specification of Letters Patent. Patented Dec. 12, 1905.

Application filed June 30, 1905. Serial No. 267,855.

*To all whom it may concern:*

Be it known that I, FLEMING E. GREATHOUSE, a citizen of the United States, residing at Garden City, in the county of Finney and State of Kansas, have invented a new and useful Reel-Carrier, of which the following is a specification.

This invention relates to an improved reel-carrier, and has for its object to provide an inexpensive, durable, and efficient device of this character by means of which wire fencing may be conveniently unwound from the spool preparatory to nailing or otherwise permanently securing the same to the fence-post and which may also be used for transferring the wire to the spool when it is desired to remove the fencing.

With these and other objects in view the present invention consists in the construction and novel combination and arrangement of parts hereinafter more fully described, illustrated in the accompanying drawings, and pointed out in the claims hereto appended, it being understood that various changes in form, proportions, and minor details may be resorted to without departing from the principle or sacrificing any of the advantages of this invention.

In the accompanying drawings, forming a part of this specification, Figure 1 is a top plan view of the improved reel-carrier, showing the same attached to a vehicle. Fig. 2 is a side elevation of the same. Fig. 3 is a front elevation showing the shaft removed and the spool in position for transferring the wire from the fence.

Similar numerals of reference indicate corresponding parts in all the figures of the drawings.

The improved device comprises a substantially rectangular frame designed to be attached to a wagon or other vehicle 5 by means of suitable chains 6, said frame comprising a pair of parallel side bars 7, connected by transverse beams 8, through which extend diagonal braces 9, the opposite ends of said braces being threaded, as indicated at 10, for the reception of nuts 11.

Extending transversely of the frame, at the rear end thereof, is a removable spool-carrying shaft 12, secured in suitable alined openings 13 by means of pins or rods 14, and upon which is mounted for rotation a wire-receiving spool 15. The spool 15 is spaced from the side bars 7 of the frame by means of bearing-collars 16, riveted or otherwise rigidly secured to the adjacent faces of the bars, as shown. The shaft 12 is provided with a plurality of spaced openings 17, adapted to receive cotter-pins 18 for retaining bearing-sleeves 18' in position on the shaft 12 when the latter is removed from the frame and used for transferring the wire fencing to the spool. The openings 17 adjacent the side faces of the wire-carrying spool 15 serve to receive the pins 14 when the shaft is in position on said frame. The shaft 12 is also provided at one end thereof with a terminal opening 19, adapted to receive a handle 20 for rotating said shaft in reeling the wire fencing, as will be more fully explained hereinafter.

In operation when it is desired to fasten the fencing in position on the fence-post one end of the wire is attached to one of the posts and the supporting-frame drawn forward by the wagon or truck, thereby rotating the reel and permitting the wire to be unwound therefrom. When it is desired to transfer the fencing to the reel, the shaft 12 is removed from the supporting-frame and the empty wire-carrying spool rigidly secured thereto by a clamping member 21, the latter comprising a rod having a stationary clamping member at one end thereof and a movable clamping member 22, threaded on the opposite end of the same. The bearing-sleeves 18' are then placed on the shaft and retained in position by inserting the cotter-pins 18, after which the handle or crank 20 is inserted in the terminal opening 19 and secured therein by clamping-nuts 23. An operator then supports one end of the shaft 12 by grasping the bearing-sleeve 18', while another operator grasps the opposite bearing-sleeve and rotates the shaft by turning the handle or crank 20, thereby rotating the shaft within the bearing-sleeves and winding the wire fencing upon the spool. If desired, however, the transferring device may be successfully operated by a single operator by mounting a wheel on one end of the shaft, in which event the opposite end of the shaft will be supported by grasping the adjacent bearing-sleeve and turning the terminal crank or handle in the manner before stated. By having the supporting-frame fastened in the manner described the several parts may be readily disconnected and conveniently packed for transportation or shipment.

From the foregoing description it will be seen that there is provided an extremely simple and inexpensive device admirably adapted for the attainment of the ends in view.

Having fully described the invention, what is claimed is—

1. A device of the class described comprising a shaft provided with a terminal opening, a threaded operating-handle engaging said opening, a wire-receiving spool mounted for rotation with the shaft, bearing-collars mounted on the shaft at opposite ends thereof, means for clamping the spool on said shaft and nuts engaging the threaded portion of the operating-handle and bearing against the shaft.

2. A device of the class described comprising a shaft provided with a terminal operating-handle, a wire-receiving spool mounted on the shaft, a clamping member extending through the shaft and engaging the wire-receiving spool for clamping the latter to the shaft, bearing-sleeves mounted on said shaft on each side of the wire-receiving spool, and pins seated in openings in the shaft on each side of the bearing-collars for retaining the latter in position on said shaft.

In testimony that I claim the foregoing as my own I have hereto affixed my signature in the presence of two witnesses.

FLEMING E. GREATHOUSE.

Witnesses:
M. F. GRIGGS,
H. H. HATHEWAY.